(12) United States Patent
Nanda (10) Patent No.: US 7,937,088 B2
(45) Date of Patent: May 3, 2011

(54) ROUTING COMMUNICATIONS IN AN AD HOC NETWORK

(75) Inventor: Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 931 days.

(21) Appl. No.: 10/809,997

(22) Filed: Mar. 26, 2004

(65) Prior Publication Data

US 2005/0213531 A1    Sep. 29, 2005

(51) Int. Cl.
*H04W 40/00* (2009.01)
*H04L 12/28* (2006.01)

(52) U.S. Cl. .................. 455/445; 370/254

(58) Field of Classification Search .............. 370/401
See application file for complete search history.

(56) References Cited

U.S. PATENT DOCUMENTS

| | | | | |
|---|---|---|---|---|
| 6,134,673 A * | 10/2000 | Chrabaszcz | | 714/13 |
| 6,304,556 B1 * | 10/2001 | Haas | | 370/254 |
| 6,564,261 B1 * | 5/2003 | Gudjonsson et al. | | 709/227 |
| 6,628,620 B1 * | 9/2003 | Cain | | 370/248 |
| 6,707,425 B2 | 3/2004 | Louhi | | |
| 6,807,165 B2 | 10/2004 | Belcea | | |
| 6,873,839 B2 | 3/2005 | Stanforth | | |
| 6,879,574 B2 | 4/2005 | Naghian et al. | | |
| 7,035,650 B1 * | 4/2006 | Moskowitz et al. | | 455/456.5 |
| 7,042,988 B2 * | 5/2006 | Juitt et al. | | 379/88.17 |
| 7,443,838 B2 | 10/2008 | Sakata | | |
| 2002/0042848 A1 * | 4/2002 | Takats | | 709/316 |
| 2002/0080750 A1 * | 6/2002 | Belcea | | 370/337 |
| 2002/0082035 A1 * | 6/2002 | Aihara et al. | | 455/518 |
| 2002/0090949 A1 | 7/2002 | Stanforth | | |
| 2002/0191584 A1 | 12/2002 | Korus et al. | | |
| 2003/0087629 A1 | 5/2003 | Juitt et al. | | |
| 2003/0179135 A1 | 9/2003 | Louhi | | |
| 2003/0235175 A1 * | 12/2003 | Naghian et al. | | 370/338 |
| 2004/0029602 A1 | 2/2004 | Kunihiro | | |
| 2005/0059379 A1 * | 3/2005 | Sovio et al. | | 455/411 |

FOREIGN PATENT DOCUMENTS

| | | |
|---|---|---|
| JP | 2002111870 A | 4/2002 |
| JP | 2002207654 A | 7/2002 |
| JP | 2003110478 A | 4/2003 |
| JP | 2003516033 T | 5/2003 |
| JP | 2003324447 A | 11/2003 |
| WO | WO9307684 A1 | 4/1993 |
| WO | WO9916266 A1 | 4/1999 |
| WO | WO0141378 A1 | 6/2001 |
| WO | WO03094546 A1 | 11/2003 |
| WO | WO03103222 A2 | 12/2003 |
| WO | WO2004001519 | 12/2003 |

OTHER PUBLICATIONS

International Search Report and Written Opinion, PCT/US2005/009791—International Searching Authority—European Patent Office, Jul. 15, 2005.

* cited by examiner

*Primary Examiner* — Nick Corsaro
*Assistant Examiner* — Joel Ajayi (57) ABSTRACT

Systems and techniques are disclosed relating to wireless communications. The systems and techniques involve wireless communications wherein a server terminal is configured to operate in a cluster on a network backbone. The server terminal includes a user interface configured to transmit and receive communications during a call with a first terminal connected to the network backbone, and a processor configured to support an inter-cluster call between second and third terminals by establishing a route on the network backbone for each communication packet transmitted from the second terminal to the third terminal.

62 Claims, 7 Drawing Sheets

ROUTING COMMUNICATIONS IN AN AD HOC NETWORK

FIELD OF INVENTION

The present disclosure relates generally to wireless communications, and more specifically, to various systems and techniques for routing communications in an ad-hoc network.

BACKGROUND OF INVENTION

In conventional wireless communications, an access network is generally employed to support communications for any number of mobile devices. These access networks are typically implemented with multiple fixed site base stations dispersed throughout a geographic region. The geographic region is generally subdivided into smaller regions known as cells. Each base station may be configured to serve all mobile devices in its respective cell. As a result, the access network may not be easily reconfigured to account for varying traffic demands across different cellular regions.

In contrast to the conventional access network, ad-hoc networks are dynamic. An ad-hoc network may be formed when a number of wireless communication devices, often referred to as terminals, decide to join together to form a network. Since terminals in ad-hoc networks operate as both hosts and routers, the network may be easily reconfigured to meet existing traffic demands in a more efficient fashion. Moreover, ad-hoc networks do not require the infrastructure required by conventional access networks, making ad-hoc networks an attractive choice for the future.

A completely ad-hoc topology consisting of peer-to-peer connections within a network generally results in very inefficient communications. Accordingly, an efficient and robust topology is needed to coordinate communications within an ad-hoc network to maximize throughput.

SUMMARY

In one aspect of the present invention, a server terminal is configured to operate in a cluster on a network backbone. The server terminal includes a user interface configured to transmit and receive communications during a call with a first terminal connected to the network backbone, and a processor configured to support an inter-cluster call between second and third terminals by establishing a route on the network backbone for each communication packet transmitted from the second terminal to the third terminal.

In another aspect of the present invention, a method of communications is performed by a server terminal configured to operate in a cluster on a network backbone. The server terminal transmits and receives communications during a call with a first terminal connected to the network backbone, and supports an inter-cluster call between second and third terminals by establishing a route on the network backbone for each communication packet transmitted from the second terminal to the third terminal.

In yet another aspect of the present invention, a server terminal is configured to operate in a cluster on a network backbone. The server terminal includes means for a user to participate in a call with a first terminal connected to the network backbone, and means for establishing a route on the network backbone for each communication packet transmitted from a second terminal to a third terminal during an inter-cluster call.

In a further aspect of the present invention, a method of communications includes a primary server terminal configured to serve a plurality of terminals in a cluster on a network backbone. The primary server terminal is used to support a plurality of inter-cluster calls for a number of the terminals in the cluster by establishing a route on the network backbone for each of the communication packets transmitted by each of the terminals engaged in one of the inter-cluster calls. The method also includes detecting a server terminal failure, designating one of the terminals in the cluster as a backup server terminal, and processing a message received from the network backbone at the backup server terminal, the message being addressed to the primary server terminal.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention may be described in the context of an Ultra Wide Band (UWB) wireless communications system. UWB technology supports high speed communications over an extremely wide bandwidth at very low power. While these inventive aspects may be well suited for use with this application, those skilled in the art will readily appreciate that these inventive aspects are likewise applicable for use in various other communication environments. Accordingly, any reference to a UWB communications system is intended only to illustrate the inventive aspects, with the understanding that such inventive aspects have a wide range of applications.

Figure 1:
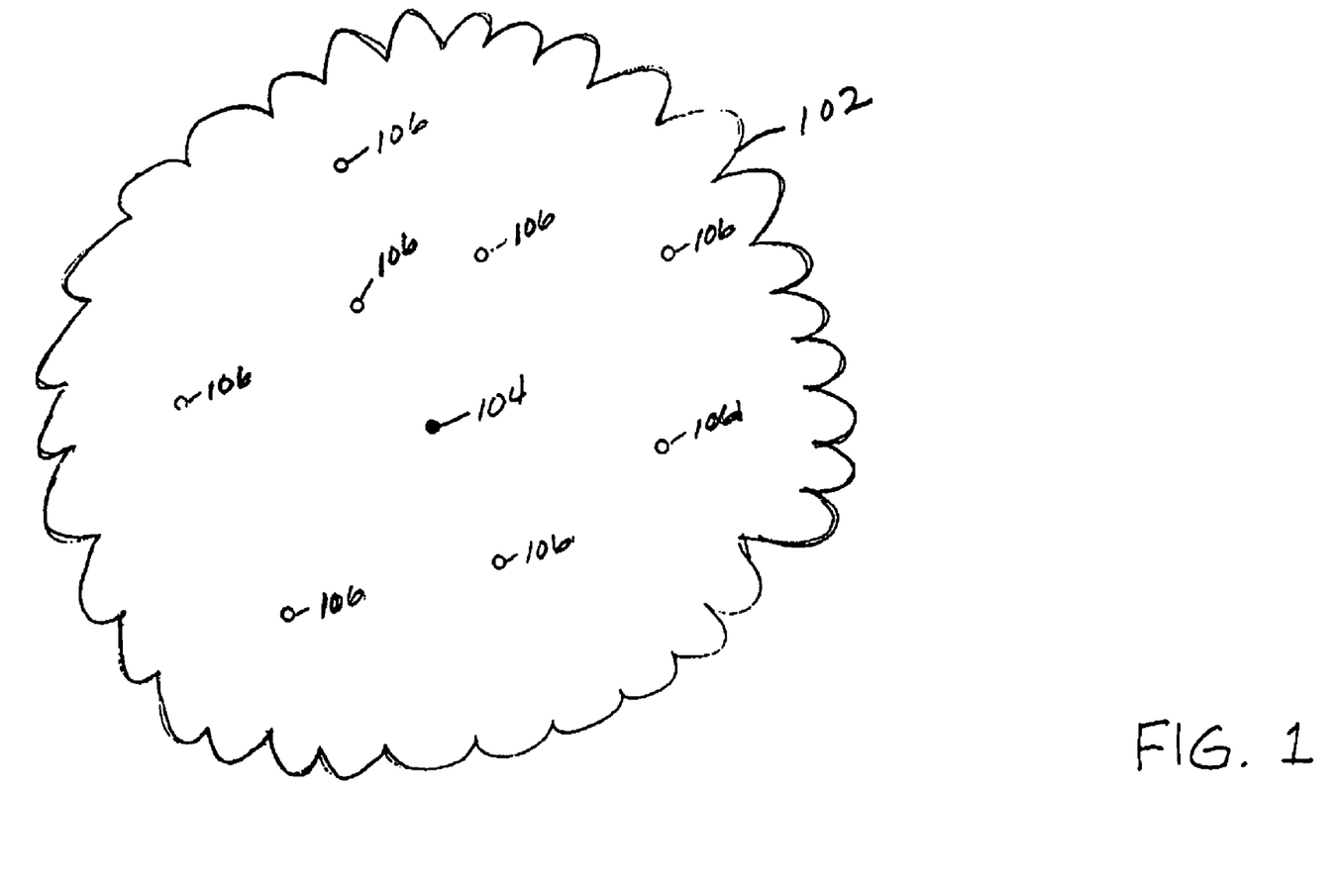
FIG. 1 is a conceptual diagram illustrating an example of a piconet.

FIG. 1 illustrates an example of a network topology for a piconet in a wireless communications system. A "piconet" is a collection of communication devices or terminals connected using wireless technology in an ad-hoc fashion. In at least one embodiment, each piconet has one master terminal and any number of member terminals slaved to the master terminal. In FIG. 1, a piconet 102 is shown with a master terminal 104 supporting communications between several member terminals 106. The master terminal 104 may be able to communicate with each of the member terminals 106 in the piconet. The member terminals 106 may also be able to directly communicate with one another. The master terminal 104 may be responsible for establishing and maintaining all connections between the terminals within the piconet 102, as well as scheduling communications over these connections. Communications between terminals within a piconet will be referred to as "intra-piconet communications."

A piconet may be formed in a variety of ways. By way of example, when a terminal initially powers up, it may search for pilot signals from various piconet master terminals. If the terminal is able to detect a pilot signal from a master terminal and determine that the pilot signal is received with sufficient strength, then the terminal may attempt to join the piconet by acquiring the pilot signal and synchronizing to the master terminal. The acquisition of a pilot signal is well known in the art.

A member terminal that is able to detect a pilot signal of sufficient strength from two (or more) master terminals may attempt to join both piconets. The terminal becomes an "intra-cluster bridge terminal" between the two piconets, and the two piconets become members of the same cluster. A "cluster" refers to a group of one or more piconets, where each piconet in the cluster has a common intra-cluster bridge terminal with at least one other terminal in the cluster.

Figure 2:
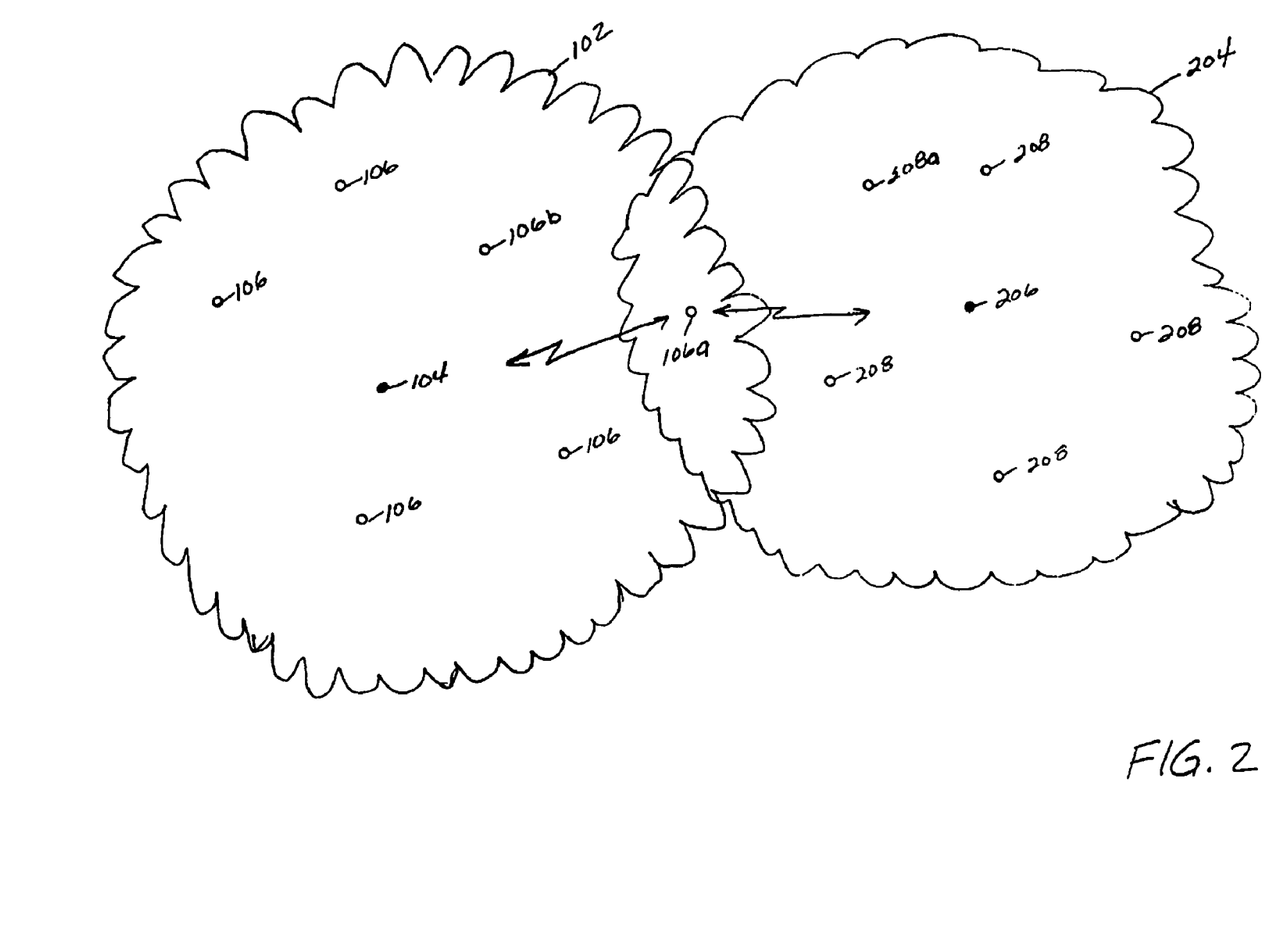
FIG. 2 is a conceptual diagram illustrating an example of two piconets forming a piconet cluster.

FIG. 2 is an example of a network topology illustrating a cluster 202 formed by two piconets 102 and 204. The first piconet 102 of the cluster 202 is the same piconet described in connection with FIG. 1 with its master terminal 104 supporting several member terminals 106. The second piconet 204 of the cluster 202 includes a master terminal 206 also supporting several member terminals 208. The member terminal 106a is a member of both the first and second piconets 102 and 204, and is therefore an intra-cluster bridge terminal. If there is more than one intra-cluster bridge between two piconets, one of them is chosen to be the primary intra-cluster bridge and the others are secondary bridges. Communications between the two piconets will be referred to as "intra-cluster communications."

In a manner to be described in greater detail later, a connection may be established between a member terminal 106b in the first piconet 102 and a member terminal 208a in the second piconet 204. The two master terminals 104 and 206 may cooperate to schedule communications between the two terminals 106b and 208a in a way that minimizes interference to other terminals in the vicinity. This process of routing communications across one or more piconets will be referred to as "intra-cluster scheduling and forwarding." A terminal in the cluster may be able to communicate with any other terminal in the cluster using some form of intra-cluster scheduling and forwarding.

In some instances, a terminal may be unable to find a pilot signal of sufficient strength from a master terminal on power up. This may result from any number of reasons. By way of example, the terminal may be too far from the master terminal. Alternatively, the propagation environment may be poor. In either case, the terminal may be unable to join an existing piconet, and therefore, may begin operating as an isolated terminal by transmitting its own pilot signal.

Figure 3:
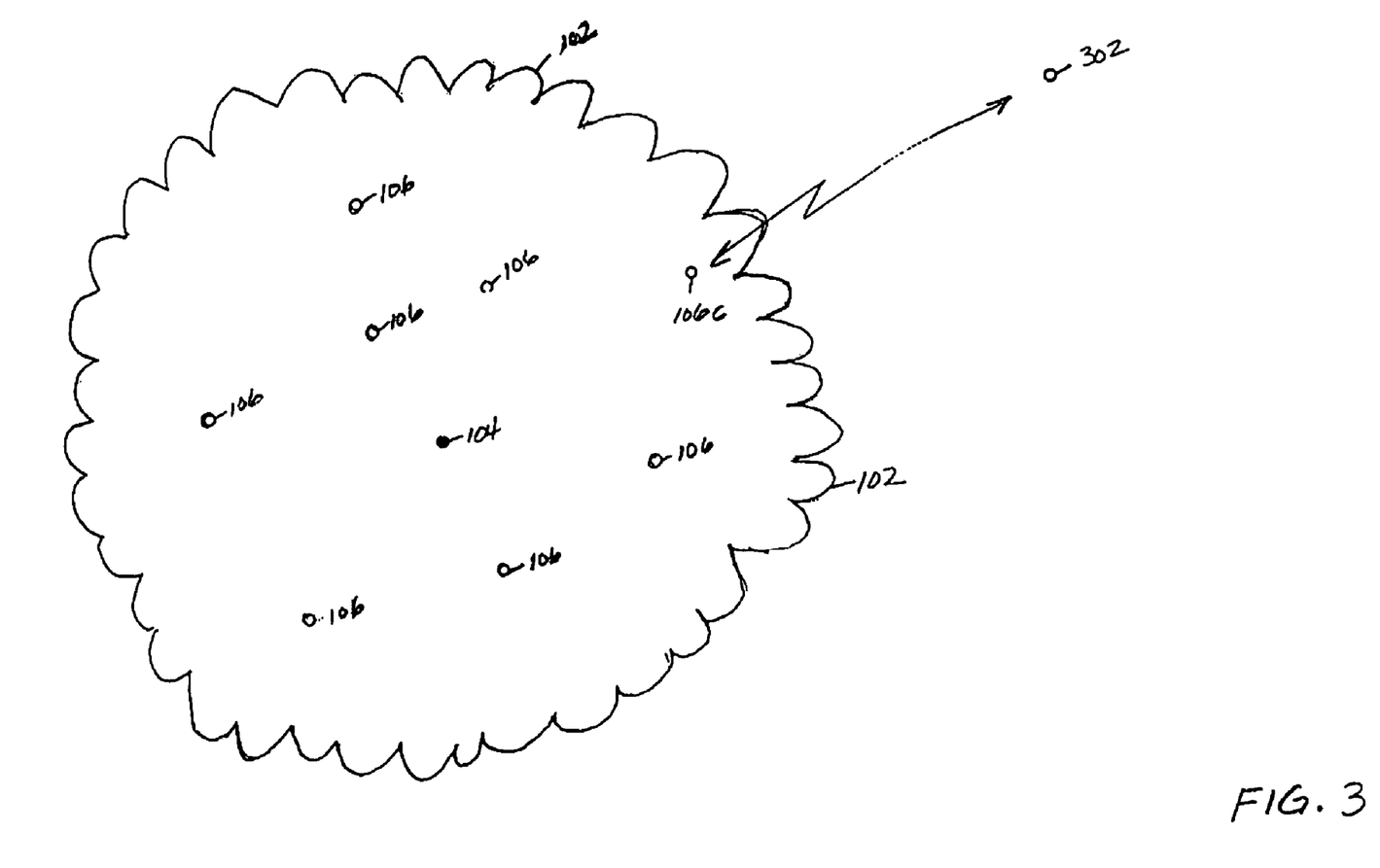
FIG. 3 is a conceptual diagram illustrating an example of a piconet having a peer-to-peer connection with an isolated terminal.

Referring to FIG. 3, the master terminal 104 may designate any number of member terminals 106 as "piconet edge terminals," such as the member terminal 106c. The designation of piconet edge terminals may be based on feedback from the various member terminals 106. The feedback may be used to provide a rough indication of those member terminals located at the edge of the piconet 102. The piconet edge terminal 106c may be assigned the task of searching for pilot signals from isolated terminals. When a piconet edge terminal 106c detects a pilot signal from an isolated terminal that cannot support the minimum required data rate, such as the isolated terminal 302, then the piconet edge terminal 106c may establish a peer-to-peer connection with the isolated terminal 302. The piconet edge terminal 106a becomes an "inter-piconet bridge terminal" to support communications between the isolated terminal 302 and any member terminal 106 in the piconet 102. The master terminal 104 may be responsible for establishing and maintaining the connection between the inter-piconet bridge terminals and the isolated terminals, as well as scheduling communications over these connections.

Figure 4:
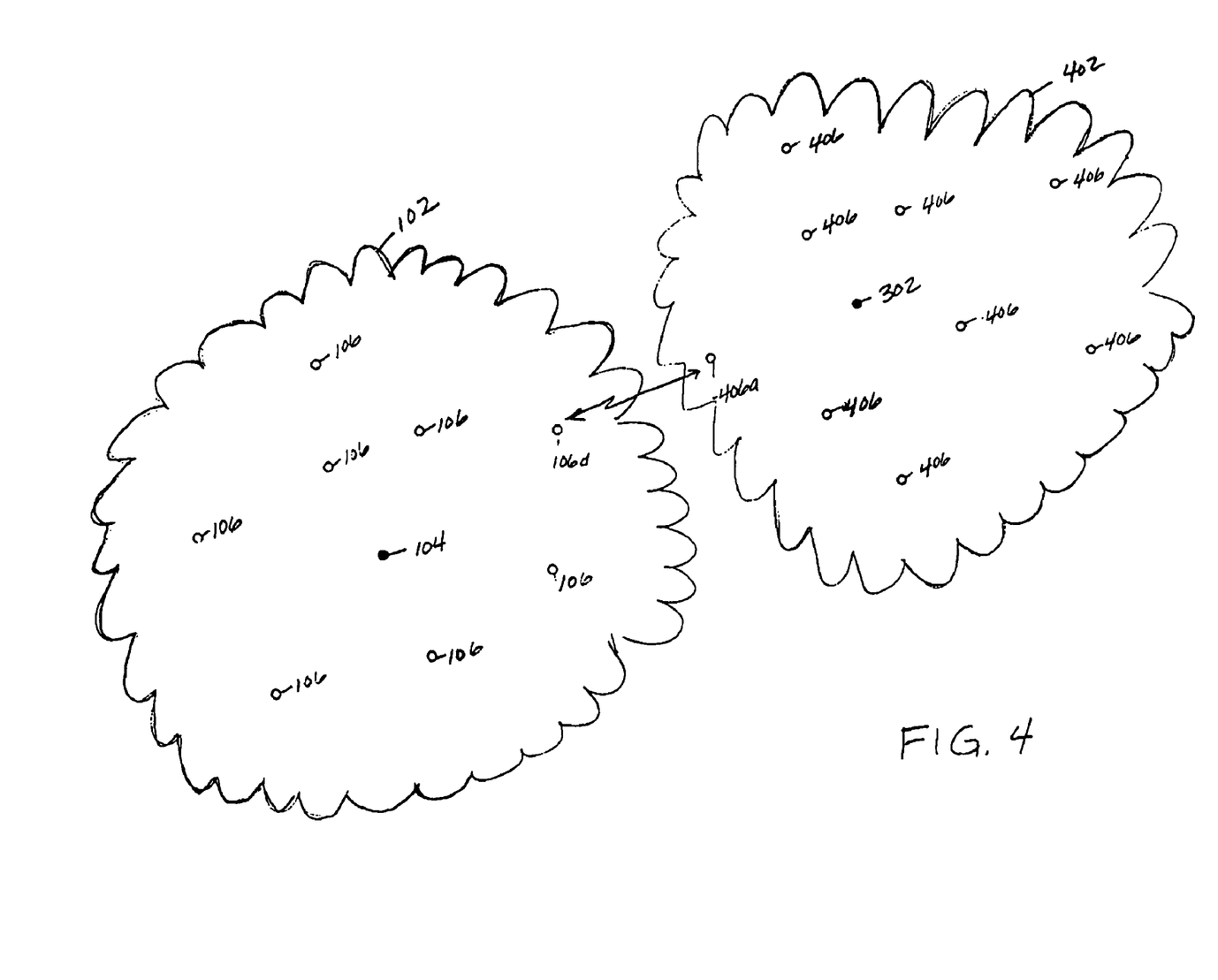
FIG. 4 is a conceptual diagram illustrating an example of two piconets having a peer-to-peer connection.

The isolated terminal 302 may become the master terminal for a new piconet. Other terminals that are able to receive the pilot signal broadcast from the isolated terminal 302 with sufficient strength may attempt to acquire that pilot signal and join the piconet of this isolated terminal. FIG. 4 illustrates an example of a network topology of this kind. The first piconet 102 is the same piconet described in connection with FIG. 1 with its master terminal 104 supporting several member terminals 106. The isolated terminal 302 described in connection with FIG. 3 has become the master terminal for a second piconet 402. The master terminal 302 in the second piconet 402 may be used to support multiple member terminals 406.

Using feedback from the various member terminals 406, the master terminal 302 in the second piconet 402 may designate one or more member terminals 406 as piconet edge terminals, such as the member terminal 406a. As described in greater detail above, the master terminal 104 in the first piconet 102 may also designate one or more member terminals 106 as piconet edge terminals, such as the member terminal 106d. Each piconet edge terminal may search for pilot signals from master terminals of piconets that are not within the same cluster. By way of example, when the piconet edge terminal 106d from the first piconet 102 detects the pilot signal broadcast from the master terminal 302 in the second piconet 402, it may establish a connection with that master terminal 302. The master terminal 302 may maintain that connection, or alternatively, assign a piconet edge terminal 406a in the second piconet 402 to maintain the connection. The piconet edge terminals 106d and 406a may be referred to as "gateways". Communications between a terminal in the first piconet 102 and a terminal in the second piconet 402 may be supported through the gateways 106d and 406a. Communications between two piconets which are not in the same cluster will be referred to as "inter-cluster communications."

Figure 5:
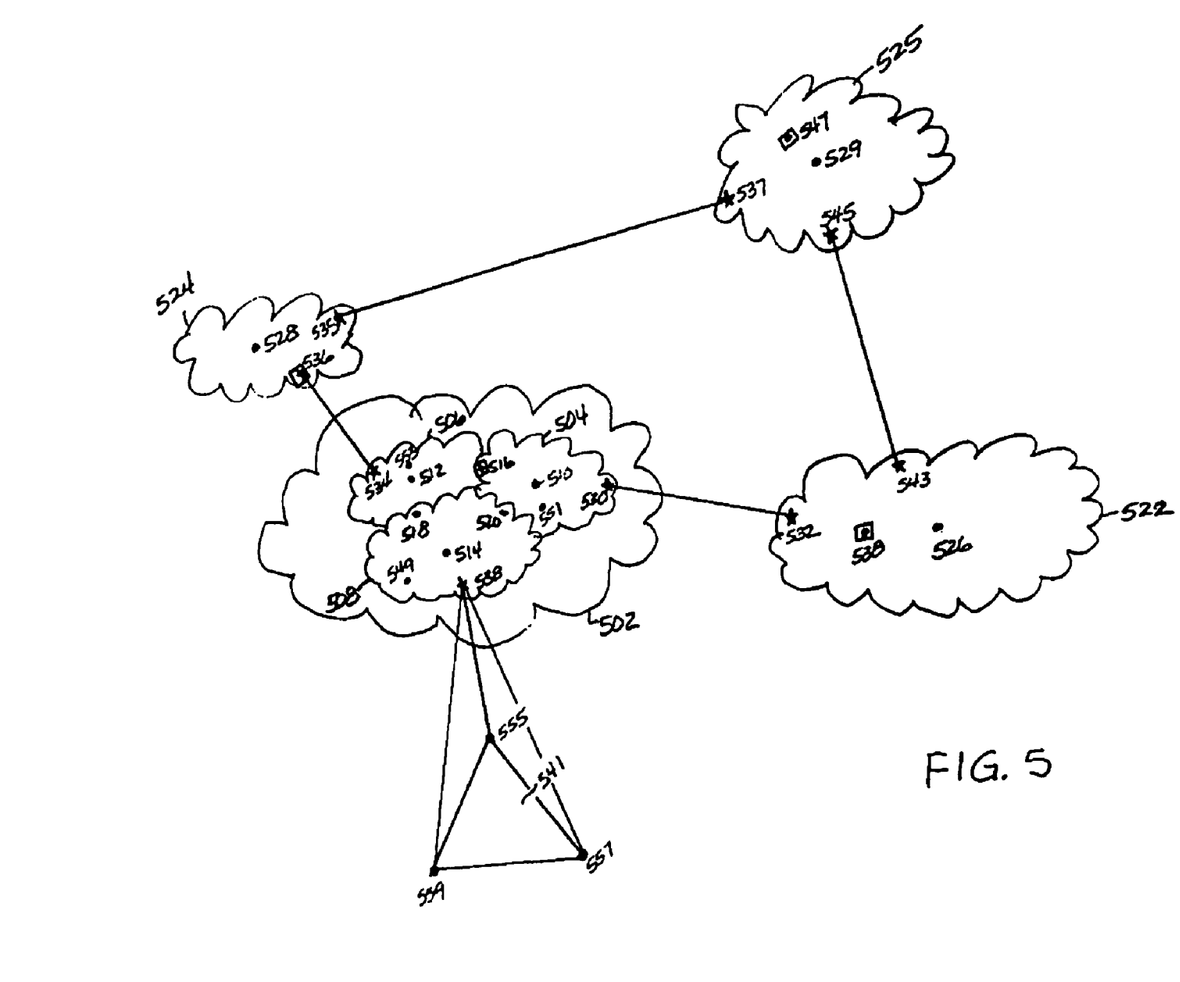
FIG. 5 is a conceptual block diagram illustrating an example of multiple clusters operating in a communications network.

FIG. 5 illustrates an example of a network topology comprising multiple clusters in a wireless communications system. Each cluster is made up of one or more piconets. A first cluster 502 is formed by three piconets 504, 506 and 508. Each piconet 504, 506 and 508 in the first cluster 502 has a master terminal 510, 512 and 514, respectively. The master terminals 510, 512 and 514 may used to support intra-piconet communications. The master terminals 510, 512 and 514 may also cooperate with one another to provide intra-cluster scheduling and forwarding functions. Intra-cluster scheduling and forwarding may be supported with a first intra-cluster bridge terminal 516 to route communications between the piconets 504 and 506, a second intra-cluster bridge terminal 518 to route communications between the piconets 502 and 506, and a third intra-cluster bridge terminal 520 to route communications between the piconets 502 and 504.

The wireless communications system shown in FIG. 5 also includes three additional clusters: a second cluster 522, a third cluster 524 and a fourth cluster 525. Each of these clusters 522, 524 and 525 are shown with one piconet for simplicity. Each of these clusters may include a master terminal 526, 528 and 529, respectively, responsible for establishing all terminal connections and scheduling all communications within its respective piconet.

Each cluster may also include one or more gateways. Gateways may be used to link adjacent clusters. Two clusters are "adjacent" if a gateway in one of them is linked to a gateway in another. In FIG. 5, the first cluster 502 is shown with three gateways. The first gateway 530 is linked to a first gateway 532 in the second cluster 522, the second gateway 534 is linked to a first gateway 536 in third cluster 524, and the third gateway 538 is linked to a peer-to-peer sub-network 541. The second cluster 522 is shown with a second gateway 543 linked to a first gateway 545 in the fourth cluster 525. The third cluster 524 is shown with a second gateway 535 linked to a second gateway 537 in the fourth cluster 525. Each of these gateway links may be used to support communications between their respective clusters and/or peer-to-peer sub-networks.

Within each cluster, one of the terminals may be used as an Address, Location and Route (ALR) server. In FIG. 5, the intra-cluster bridge terminal 516 is designated as the ALR server for the first cluster 502, a terminal 538 is designated as the ALR server for the second cluster 522, the first gateway 536 is designated as the ALR server for the third cluster 524, and a terminal 547 is designated as the ALR server for the fourth cluster 525. The peer-to-peer sub-network 541 may use the ALR server 516 in the first cluster 502. Alternatively, the peer-to-peer sub-network 541 may designate its own ALR server.

The ALR server may use one or more configuration tables to provide various services. By way of example, the ALR server may maintain a cluster membership table that includes all registered terminals within the cluster. Any terminal may register with the ALR server by sending a registration request along with a terminal identifier, such as a unique Medium Access Control Identifier (MAC ID). This registration request may be sent at the time power is first applied to the terminal, or any time thereafter. In response to the registration request, the ALR server may assign and forward a network address to the terminal. The network address may include an ALR server identifier (ALR ID) appended to the MAC ID of the terminal. The registration process may be performed using intra-cluster scheduling and forwarding.

As described in greater detail earlier, the master terminal is responsible for establishing, maintaining and scheduling communications within its piconet. The master terminal is also responsible for supporting communications across piconets within its cluster through one or more intra-cluster bridge terminals within its piconet. Accordingly, the ALR server communicates through an intra-cluster bridge terminal with the appropriate master terminal for routing communications within the cluster. The cluster membership table may be used to map each registered terminal to its master terminal. In addition, the bridge terminal to registered terminal may also be included. An example of a cluster membership table for three terminals 549, 551 and 553 in the first cluster 502 is shown below.

TABLE 1

| Cluster Member | Piconet Master | Bridge |
|---|---|---|
| Terminal 549 | Terminal 514 | Terminal 520 |
| Terminal 551 | Terminal 510 | |
| Terminal 553 | Terminal 512 | |

The cluster membership table may also include registered terminals in a peer-to-peer sub-network. The registered terminals may be mapped to the gateway and the master terminal for the gateway. An example of a cluster membership table for the first cluster 502 with three peer-to-peer sub-network terminals 555, 557 and 559 is shown below.

TABLE 2

| Cluster Member | Piconet Master | Bridge |
|---|---|---|
| Terminal 549 | Terminal 514 | Terminal 518 |
| | | Terminal 520 |
| Terminal 551 | Terminal 510 | Terminal 516 |
| | | Terminal 520 |
| Terminal 553 | Terminal 512 | Terminal 516 |
| | | Terminal 518 |
| Terminal 555 | Terminal 514 | Terminal 538 |
| Terminal 557 | Terminal 514 | Terminal 538 |
| Terminal 559 | Terminal 514 | Terminal 538 |

Figure 6:
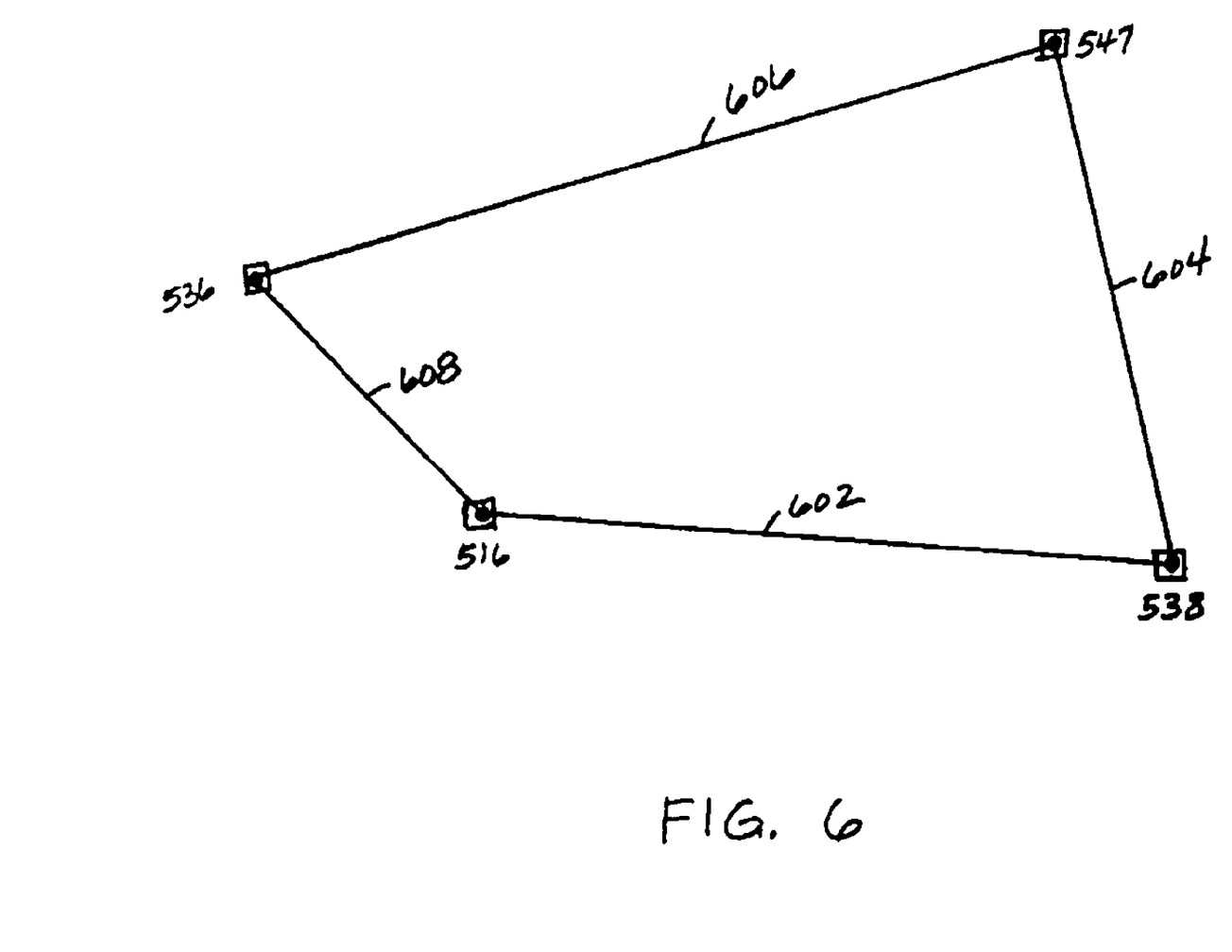
FIG. 6 is a graphical representation illustrating an example of a network backbone topology map for the communications network of FIG. 5.

Communications between terminals in different clusters may be made over the network backbone. The network backbone may be represented by a network backbone topology map showing all logical links connecting the ALR servers. A logical link exists between two ALR servers, if the two clusters are directly connected through gateways, one in each cluster. FIG. 6 is an example of a topology map for the network backbone shown in FIG. 5. The network backbone topology map includes four links: a first link 602 between the ALR servers 516 and 538 in the first and second clusters, a second link 604 between the ALR servers 538 and 547 in the second and fourth clusters, a third link 606 between the ALR servers 547 and 536 in the fourth and third clusters, and a fourth link 608 between the ALR servers 536 and 516 in the fourth and first clusters.

The messages propagated on the network backbone by the ALR servers may also include network backbone topology information. The ALR server may use this information to create and maintain a network backbone topology map. The network backbone topology map may be used to create one or more configuration tables, such as a local backbone connectivity table. The "local backbone" includes the links for all adjacent clusters. An example of a local backbone connectivity table for the ALR server 538 in the second cluster 522 is illustrated in Table 3 below.

TABLE 3

| Adjacent ALR | Gateway | Piconet Master of Gateway |
| --- | --- | --- |
| Terminal 516 | Terminal 532 | Terminal 526 |
| Terminal 547 | Terminal 543 | Terminal 526 |

The local backbone connectivity table maps each adjacent cluster to the gateway that provides the link to that cluster and the master terminal for the gateway. The inclusion of the master terminal allows the ALR server to communicate with the master terminal to request establishment of a link from a terminal in the cluster to the gateway using intra-cluster scheduling and forwarding techniques.

The ALR server may also use the network backbone topology map to create and maintain a network backbone routing table. The network backbone routing table may be used to select one of the adjacent clusters from the local backbone connectivity table to be the next-hop on the primary route to a destination terminal in another cluster. The primary route between two adjacent clusters may be selected using a modified shortest-path routing scheme based on the current network backbone topology map. Link weights may be computed by the ALR server based on the cost of using multiple hops on the network backbone enroute to the destination terminal in another cluster. The cost may be computed as a function of hop-count, as well as the energy required to communicate on each hop. Additional adjacent clusters may be listed as secondary routes to the destination terminal. Thus, between any two adjacent clusters, there may be a unique primary route and possibly many different secondary routes.

An example of a network backbone routing table at the ALR terminal 538 for the second cluster 522 is illustrated in Table 4 below.

TABLE 4

| Adjacent ALR | Next Hop (Primary Route) | Next Hop (Secondary Route) |
| --- | --- | --- |
| Terminal 516 | Terminal 516 | — |
| Terminal 547 | Terminal 547 | — |
| Terminal 536 | Terminal 516 | Terminal 547 |

Referring to Table 4, the ALR 538 server may select the ALR server 516 in the first cluster 502 from the local backbone connectivity table as the next hop on the primary route to a destination terminal in the third cluster 524. The ALR server 538 may select the ALR server 547 in the fourth cluster 525 as the next hop on a secondary route to the destination terminal.

Returning to FIG. 5, the ALR servers may use any protocol to propagate messages on the network backbone. The messages may include location requests and responses. A location request may be based on the MAC ID, the user name, or any other type of information that identifies the terminal to be located within the network. By way of example, when an originating terminal in the second cluster 522 originates a call to a destination terminal in the third cluster 524, it prompts its ALR server 538 for the network address of the destination terminal. If this terminal cannot be found in the cluster membership table, the ALR server 538 may broadcast a location request to the ALR servers on the network backbone. When the ALR server 536 in the third cluster 524 receives the location request, it may respond by providing the network address for the destination terminal from its cluster membership table to the ALR server 538 in the second cluster 522.

The ALR server may be configured to support connectionless and connection-oriented communications. "Connectionless" communications refer to communication packets that may be routed over different paths on the network backbone depending on the current configuration of the local backbone connectivity table and the network backbone routing table. In these types of connections, the communications may be routed to each cluster on the primary route to the destination terminal.

"Connection-oriented" communications, on the other hand, may use a dedicated path to support the call. This may be advantageous to support, by way of example, a long-lived connection. In these types of connections, the ALR server may chose the best route from among the primary and a number of secondary routes based on resource utilization, route stability and information flow considerations.

In the various embodiments described thus far, messages that traverse one or more piconets and/or clusters pass through intra-cluster bridge terminals and/or gateways. These messages may include location requests and responses, as well as network backbone topology information. While forwarding these messages, the intra-cluster bridge terminals and gateways may also maintain and update their own copies of the network backbone topology map, the local backbone routing table, the local backbone connectivity table, as well as maintain a network address cache. Network address caching may help reduce overhead on the network backbone due to location requests and responses. The originating terminal may also cache the network address of the destination terminal, and vice versa, to avoid subsequent queries and thus reduce the load on the ALR server.

Each cluster may designate one or more terminals as backup ALR servers. In case of ALR server failure, one of the backup ALR servers may be promoted to primary ALR server for the cluster. This procedure may be implemented entirely in the cluster without effecting the other clusters in the network. The new ALR server may then start broadcasting topology updates on the network backbone announcing the failure of the previous ALR server and the identity and location of the of the new ALR server. For a period of time, the identifier for either the failed ALR server and the new ALR server may be recognized as the network identifier for the cluster. That is, until the ALR server failover information is propagated through the network, both ALR server identifiers remain valid. Communications with either ALR server identifier get routed to the cluster. Eventually, the failed ALR server identifier will expire. This approach ensures that the failure of an ALR server in any cluster has no impact on on-going communications. Moreover, no drastic network wide recovery action is required.

Figure 7:
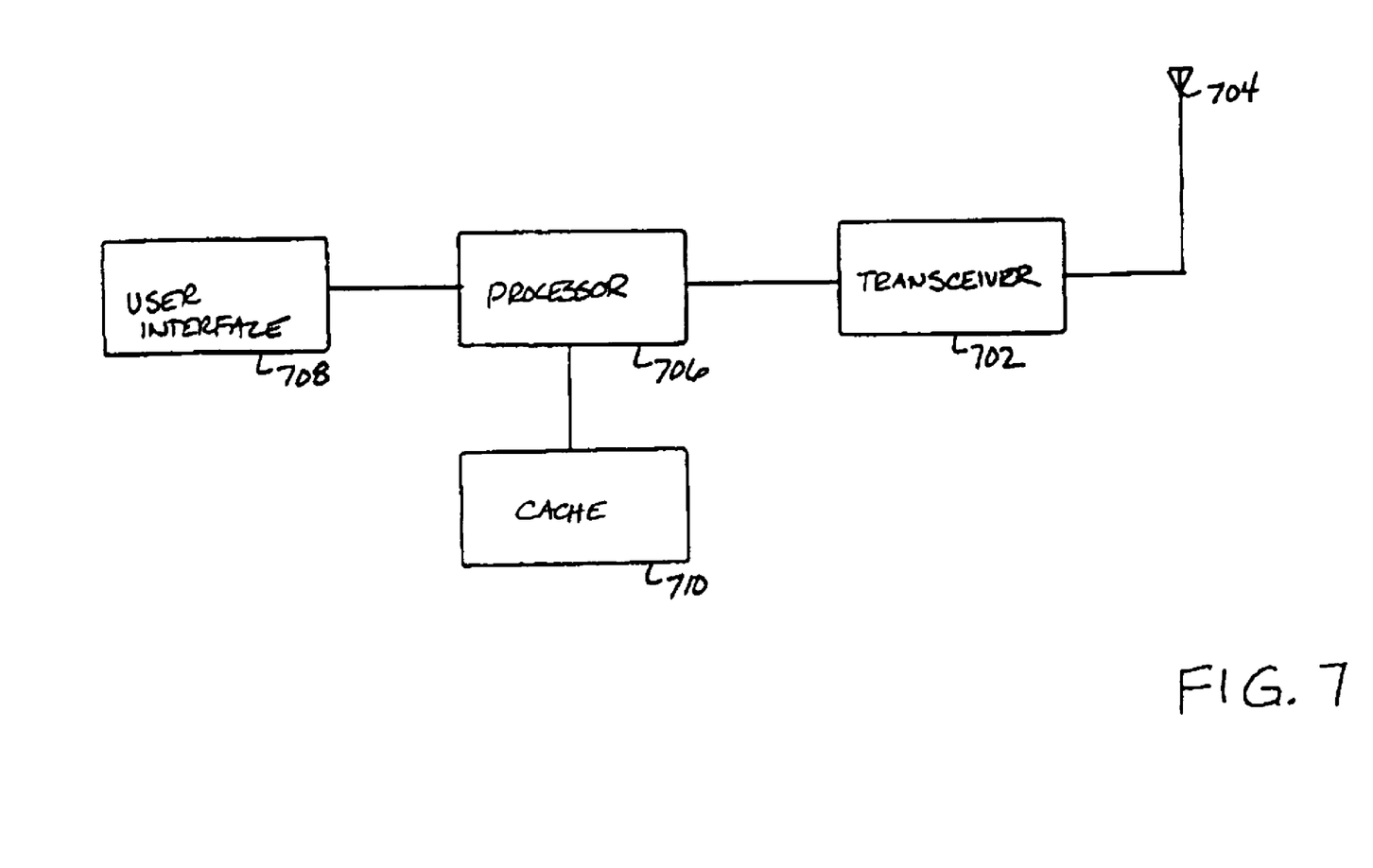
FIG. 7 is a conceptual block diagram of a terminal capable of operating as an ALR server in a communications network.

FIG. 7 is a conceptual block diagram illustrating one possible configuration of a terminal capable of operating as an ALR server. As those skilled in the art will appreciate, the precise configuration of the terminal may vary depending on the specific application and the overall design constraints. For the purposes of clarity and completeness, the various inventive concepts will be described in the context of a UWB terminal with spread-spectrum capability, however, such inventive concepts are likewise suitable for use in various other communication devices. Accordingly any reference to a spread-spectrum UWB terminal is intended only to illustrate the various aspects of the present invention, with the understanding that such aspects have a wide range of applications.

The terminal may be implemented with a transceiver 702 coupled to an antenna 704. A processor 706 may be coupled to the transceiver 702. The processor 706 may be implemented with a software based architecture, or another type of architecture. The software based architecture may be configured with a microprocessor (not shown) that serves as a platform to run software programs that, among other things, provide executive control and overall system management functions that allow the terminal to operate as an ALR server. The processor 706 may also include a digital signal processor (DSP) (not shown) with an embedded communications software layer which runs application specific algorithms to reduce the processing demands on the microprocessor.

The terminal may also include various user interface 708 coupled to the processor 706. The user interface 708 may include various devices such as a keypad, mouse, touch screen, display, ringer, vibrator, audio speaker, microphone, camera and/or the like. The devices allow a user on the terminal to place and receive calls with other terminals connected to the network backbone.

The processor 706 may provide various signal processing functions such as pilot signal acquisition, time synchronization, frequency tracking, spread-spectrum processing, modulation and demodulation functions, forward error correction, packetizing and depacketizing communications, and/or any other signal processor functions appropriate to support calls with other terminals connected to the network backbone. These signal processing functions may be implemented with an embedded software layer in a DSP, or alternatively, by any other means.

The processor 706 may be configured to operate as an ALR server. In the software based implementation of the processor 706, the ALR server function may be a software program running on the microprocessor. However, as those skilled in the art will readily appreciate, the ALR server function is not limited to this embodiment, and may be implemented by other means, including a hardware configuration, firmware configuration, software configuration, or any combination thereof, which is capable of performing the various functions described herein.

The processor 706 may create and maintain one or more configuration tables to provide the various ALR server functions. By way of example, the ALR server may maintain a cluster membership table that includes all registered terminals within the cluster. Any terminal may register with the terminal through an exchange of registration messages that prompt the processor 706 to assign a network address to the terminal and add it to the cluster membership table.

The processor 706 may be further configured to transmit and receive messages on the network backbone. The messages may include network backbone topology information. The processor 706 may use the network backbone topology information to construct the network backbone topology map. The network backbone topology map may be used to create and maintain the local backbone connectivity table and the network backbone routing table. These configuration tables may be used by the processor 706 to establish routes on the network backbone for each communication packet transmitted by a terminal within the cluster to a terminal outside the cluster.

The messages transmitted or received on the network backbone by the processor 706 may also include location requests and responses. Location requests may be transmitted on the network backbone by the processor 706 in response to a call origination request from a terminal within the cluster. The processor 706 may transmit a location request to locate and obtain the network address for the destination terminal, or provide the network address from a stored entry in cache 708. If the location request is transmitted on the network backbone, the network address of the destination terminal received in the location response may be stored in the cache 708.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A server terminal configured to operate in an ad hoc cluster of terminals, comprising:
 a user interface configured to transmit and receive communications during a call with a first terminal connected to an ad hoc network backbone of an ad hoc network, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;
 a processor configured to support an inter-cluster call between a second terminal in a first ad hoc cluster and a third terminal in a second ad hoc cluster by establishing a route on the network backbone for each communication packet transmitted from the second terminal to the third terminal, the route selected from a plurality of routes depending on whether the inter-cluster call is a first type of call or a second type of call that is different from the first type of call; and the processor further configured to establish the route by:
mapping at least one adjacent ad hoc cluster to the corresponding gateway terminal and the corresponding master terminal; and
communicating with the corresponding master terminal associated with the selected one of the plurality of routes via the corresponding gateway terminal to support intra-cluster scheduling and forwarding of the communication packet from the second terminal.

2. The server terminal of claim 1, wherein the processor is further configured to establish the same route for each of the communication packets transmitted from the second terminal to the third terminal during the inter-cluster call for the first type of call, and to establish a different route for at least two of the communication packets transmitted from the second terminal to the third terminal during the inter-cluster call for the second type of call.

3. The server terminal of claim 1, wherein the processor is further configured to establish the route by constructing a network backbone topology map and selecting the route based on information in the network backbone topology map.

4. The server terminal of claim 3, wherein the processor is further configured to select the route as a function of the number of intermediary clusters between the second and third terminals.

5. The server terminal of claim 4, wherein the processor is further configured to select the route as a function of the energy of such transmission.

6. The server terminal of claim 1, wherein the processor is further configured to establish the route by mapping the third terminal to a primary route on the ad hoc network backbone to a first adjacent cluster and a secondary route on the ad hoc network backbone to a second adjacent cluster, and selecting the primary route or secondary route.

7. The server terminal of claim 6, wherein the processor is further configured to select the primary route during the first type of inter-cluster call, and select either the primary or secondary route during the second type of call, the selection of the primary or secondary route being based on the loading of the ad hoc network backbone.

8. The server terminal of claim 6, wherein the processor is further configured to establish the route by mapping the primary route to a first adjacent gateway terminal and a first adjacent master terminal for the first adjacent gateway terminal, and mapping the secondary route to a second adjacent gateway terminal and a second adjacent master terminal for the second adjacent gateway terminal.

9. The server terminal of claim 8, wherein the processor is further configured to establish the route by communicating with the respective one of the first adjacent master terminal or the second adjacent master terminal corresponding to the selected one of the primary or secondary routes to support intra-cluster scheduling and forwarding of such communication packet from the second terminal to the corresponding one of the first or second adjacent gateway.

10. The server terminal of claim 1, wherein the processor is further configured to establish the route using a network address assigned to the third terminal, and received from the network backbone in response to a location request.

11. The server terminal of claim 10, further comprising a cache, and wherein the processor is further configured to establish the route using a network address assigned to third terminal and stored in the cache.

12. A method of communications on a server terminal configured to operate in an ad hoc cluster of terminals, comprising:

transmitting and receiving communications at the server terminal during a call with a first terminal connected to an ad hoc network backbone of an ad hoc network, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;

supporting an inter-cluster call between a second terminal in a first ad hoc cluster and a third terminal in a second ad hoc cluster by establishing a route on the ad hoc network backbone for each communication packet transmitted from the second terminal to the third terminal, the route selected from a plurality of routes depending on whether the inter-cluster call is a first type of call or a second type of call that is different from the first type of call; and the establishing of the route further comprising:
mapping at least one adjacent ad hoc cluster to the corresponding gateway terminal and the corresponding master terminal; and
communicating with the corresponding master terminal associated with the selected one of the plurality of routes via the corresponding gateway terminal to support intra-cluster scheduling and forwarding of the communication packet from the second terminal.

13. The method of claim 12, wherein the same route is established for each of the communication packets transmitted from the second terminal to the third terminal during the first type of inter-cluster call.

14. The method of claim 12, wherein a different route is established for at least two of the communication packets transmitted from the second terminal to the third terminal during the second type of inter-cluster call.

15. The method of claim 12, wherein the route is established by constructing a network backbone topology map and selecting the established route based on information in the network backbone topology map.

16. The method of claim 15, wherein the route is selected as a function of the number of intermediary clusters between the second and third terminals.

17. The method of claim 16, wherein the route is selected as a function of the energy of such transmission.

18. The method of claim 12, wherein the route is established by mapping the third terminal to a primary route on the ad hoc network backbone to a first adjacent cluster and a secondary route on the ad hoc network backbone to a second adjacent cluster, and selecting the primary route or the secondary route.

19. The method of claim 18, wherein the primary route is selected for each of the communication packets transmitted from the second terminal to the third terminal during the inter-cluster call.

20. The method of claim 18, wherein the selection of the primary or secondary route for each of the communication packets transmitted from the second terminal to the third terminal during the inter-cluster call is based on the loading of the ad hoc network backbone.

21. The method of claim 18, wherein the route is established by mapping the primary route to a first adjacent gateway terminal and a first adjacent master terminal for the first adjacent gateway terminal, and mapping the secondary route to a second adjacent gateway terminal and a second adjacent master terminal for the second adjacent gateway terminal.

22. The method of claim 21, wherein the route is established by communicating with the respective one of the first adjacent master terminal or the second adjacent master terminal corresponding to the selected one of the primary or secondary routes to support intra-cluster scheduling and forwarding of such communication packet from the second terminal to the corresponding one of the first or second adjacent gateway terminal.

23. The method of claim 12, wherein the route is established using a network address assigned to third terminal, the method further comprising receiving the network address from the ad hoc network backbone in response to a location request.

24. The method of claim 23, wherein the route is established using a network address assigned to third terminal, the method further comprising retrieving the network address stored in cache at the server terminal.

25. A server terminal configured to operate in an ad hoc cluster of terminals, comprising:
  means for transmitting and receiving communications during a call with a first terminal connected to an ad hoc network backbone of an ad hoc network, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;
  means for establishing a route on the ad hoc network backbone for each communication packet transmitted from a second terminal in a first ad hoc cluster to a third terminal in a second ad hoc cluster during an inter-cluster call, the route selected from a plurality of routes depending on whether the inter-cluster call is a first type of call or a second type of call that is different from the first type of call; and
  the means for establishing the route further comprising:
    means for mapping at least one adjacent ad hoc cluster to the corresponding gateway terminal and the corresponding master terminal; and
    means for communicating with the corresponding master terminal associated with the selected one of the plurality of routes via the corresponding gateway terminal to support intra-cluster scheduling and forwarding of the communication packet from the second terminal.

26. A method of communications to serve a plurality of terminals in an ad hoc cluster, the method comprising:
  using a primary server terminal to support a plurality of inter-cluster calls for a number of the terminals in the ad hoc cluster by establishing a route on an ad hoc network backbone of an ad hoc network for each of the communication packets transmitted by each of the terminals to a corresponding other ad hoc cluster, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;
  dynamically designating one of the terminals in the ad hoc cluster as a backup server terminal in accordance with an ad hoc protocol;
  detecting a failure of the primary server terminal;
  processing a message received from the ad hoc network backbone at the backup server terminal based on detecting the failure, the message being addressed to the primary server terminal;
  selecting each route for each of the plurality of inter-cluster calls from a plurality of routes depending on whether the inter-cluster call is a first type of call or a second type of call that is different from the first type of call; and
  the establishing of each route further comprising:
    mapping at least one adjacent ad hoc cluster to the corresponding gateway terminal and the corresponding master terminal; and
    communicating with the corresponding master terminal associated with the selected one of the plurality of routes via the corresponding gateway terminal to support intra-cluster scheduling and forwarding of the respective communication packet.

27. The server terminal of claim 1, wherein the processor establishes the route on the ad hoc network backbone between a first inter-cluster bridge terminal in the first ad hoc cluster and a second inter-cluster bridge terminal in the second ad hoc cluster.

28. The server terminal of claim 27, wherein the inter-cluster bridge terminals comprise Address, Location, and Route (ALR) servers.

29. The method of claim 12, wherein establishing the route on the ad hoc network includes establishing the route between a first inter-cluster bridge terminal in the first ad hoc cluster and a second inter-cluster bridge terminal in the second ad hoc cluster.

30. The method of claim 29, wherein establishing the route between the first inter-cluster bridge terminal in the first ad hoc cluster and the second inter-cluster bridge terminal in the second ad hoc cluster includes establishing the route between Address, Location, and Route (ALR) servers.

31. At least one processor for communications on a server terminal configured to operate in an ad hoc cluster of terminals, comprising:
  a first module for transmitting and receiving communications at the server terminal during a call with a first terminal connected to an ad hoc network backbone of an ad hoc network, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;
  a second module for supporting an inter-cluster call between a second terminal in a first ad hoc cluster and a third terminal in a second ad hoc cluster by establishing a route on the network backbone for each communication packet transmitted from the second terminal to the third terminal, the route selected from a plurality of routes depending on whether the inter-cluster call is a first type of call or a second type of call that is different from the first type of call; and the second module for supporting the inter-cluster call by establishing the route further configured for:
mapping at least one adjacent ad hoc cluster to the corresponding gateway terminal and the corresponding master terminal; and
communicating with the corresponding master terminal associated with the selected one of the plurality of routes via the corresponding gateway terminal to support intra-cluster scheduling and forwarding of the communication packet from the second terminal.

32. A computer program product for communications on a server terminal configured to operate in an ad hoc cluster of terminals, comprising:
a computer-readable storage medium comprising:
a first set of codes for causing a computer to transmit and to receive communications at the server terminal during a call with a first terminal connected to an ad hoc network backbone of an ad hoc network, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;
a second set of codes for causing the computer to support an inter-cluster call between a second terminal in a first ad hoc cluster and a third terminal in a second ad hoc cluster by establishing a route on the network backbone for each communication packet transmitted from the second terminal to the third terminal, the route selected from a plurality of routes depending on whether the inter-cluster call is a first type of call or a second type of call that is different from the first type of call; and
the second set of codes for establishing the route further comprising:
at least one code for mapping at least one adjacent ad hoc cluster to the corresponding gateway terminal and the corresponding master terminal; and
at least one code for communicating with the corresponding master terminal associated with the selected one of the plurality of routes via the corresponding gateway terminal to support intra-cluster scheduling and forwarding of the communication packet from the second terminal.

33. At least one processor for communications to serve a plurality of terminals in an ad hoc cluster, comprising:
a first module for using a primary server terminal to support a plurality of inter-cluster calls for a number of the terminals in the ad hoc cluster by establishing a route on an ad hoc network backbone of an ad hoc network for each of the communication packets transmitted by each of the terminals to a corresponding other ad hoc cluster, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;
a second module for dynamically designating one of the terminals in the ad hoc cluster as a backup server terminal in accordance with an ad hoc protocol;
a third module for detecting a failure of the primary server terminal;
a fourth module for processing a message received from the ad hoc network backbone at the backup server terminal based on detecting the failure, the message being addressed to the primary server terminal;
the first module selecting each route from a plurality of routes depending on whether the inter-cluster call is a first type of call or a second type of call that is different from the first type of call; and
the first module establishing each route by:
mapping at least one adjacent ad hoc cluster to the corresponding gateway terminal and the corresponding master terminal; and
communicating with the corresponding master terminal associated with the selected one of the plurality of routes via the corresponding gateway terminal to support intra-cluster scheduling and forwarding of the respective communication packet.

34. A computer program product for communications to serve a plurality of terminals in an ad hoc cluster, comprising:
a computer-readable storage medium comprising:
a first set of codes for causing a computer to use a primary server terminal to support a plurality of inter-cluster calls for a number of the terminals in the ad hoc cluster by establishing a route on an ad hoc network backbone of an ad hoc network for each of the communication packets transmitted by each of the terminals to a corresponding other ad hoc cluster, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;
a second set of codes for causing the computer to dynamically designate one of the terminals in the ad hoc cluster as a backup server terminal in accordance with an ad hoc protocol;
a third set of codes for causing the computer to detect a failure of the primary server terminal;
a fourth set of codes for causing the computer to process a message received from the ad hoc network backbone at the backup server terminal based on detecting the failure, the message being addressed to the primary server terminal;
first set of codes further comprising at least one code for selecting each route from a plurality of routes depending on whether the inter-cluster call is a first type of call or a second type of call that is different from the first type of call; and
the first set of codes for the establishing of each route further comprising:
at least one code for mapping at least one adjacent ad hoc cluster to the corresponding gateway terminal and the corresponding master terminal; and at least one code for communicating with the corresponding master terminal associated with the selected one of the plurality of routes via the corresponding gateway terminal to support intra-cluster scheduling and forwarding of the respective communication packet.

35. An apparatus for communications to serve a plurality of terminals in an ad hoc cluster, comprising:
   means for using a primary server terminal to support a plurality of inter-cluster calls for a number of the terminals in the ad hoc cluster including means for establishing a route on an ad hoc network backbone of an ad hoc network for each of the communication packets transmitted by each of the terminals to a corresponding other ad hoc cluster, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;
   means for dynamically designating one of the terminals in the ad hoc cluster as a backup server terminal in accordance with an ad hoc protocol;
   means for detecting a failure of the primary server terminal;
   means for processing a message received from the ad hoc network backbone at the backup server terminal based on detecting the failure, the message being addressed to the primary server terminal; and
   the means for establishing of each route further comprising:
      means for selecting each route from a plurality of routes depending on whether the inter-cluster call is a first type of call or a second type of call that is different from the first type of call;
      means for mapping at least one adjacent ad hoc cluster to the corresponding gateway terminal and the corresponding master terminal; and
      means for communicating with the corresponding master terminal associated with the selected one of the plurality of routes via the corresponding gateway terminal to support intra-cluster scheduling and forwarding of the respective communication packet.

36. A terminal system for communications, comprising:
   a primary server terminal used to support a plurality of inter-cluster calls for a number of the terminals in the ad hoc cluster by establishing a route on an ad hoc network backbone of an ad hoc network for each of the communication packets transmitted by each of the terminals to a corresponding other ad hoc cluster, the ad hoc network comprising a plurality of clusters, each of the clusters comprising at least two piconets and at least one gateway terminal, each gateway terminal configured to form a communications link between at least two of the plurality of clusters, each of the piconets comprising at least one intra-cluster bridge terminal, a master terminal, and a member terminal slaved to the master terminal, and the intra-cluster bridge terminal being a member of the two piconets and configured to form a communications link between the two piconets;
   a processor for dynamically designating one of the terminals in the ad hoc cluster as a backup server terminal in accordance with an ad hoc protocol, for detecting a failure of the primary server terminal, and for processing a message received from the ad hoc network backbone at the backup server terminal based on detecting the failure, the message being addressed to the primary server terminal, each route selected from a plurality of routes depending on whether the inter-cluster call is a first type of call or a second type of call that is different from the first type of call;
   the establishing of each route further comprising:
      mapping at least one adjacent ad hoc cluster to the corresponding gateway terminal and the corresponding master terminal; and
      communicating with the corresponding master terminal associated with the selected one of the plurality of routes via the corresponding gateway terminal to support intra-cluster scheduling and forwarding of the respective communication packet.

37. The at least one processor of claim 31, wherein the second module establishes the route on the ad hoc network backbone between a first inter-cluster bridge terminal in the first ad hoc cluster and a second inter-cluster bridge terminal in the second ad hoc cluster.

38. The at least one processor of claim 37, wherein the first and second inter-cluster bridge terminals are Address, Location, and Route (ALR) servers.

39. The at least one processor of claim 31, wherein the second module is further configured to establish the route by mapping a primary route on the ad hoc network backbone to a first adjacent ad hoc cluster and a secondary route on the ad hoc network backbone to a second adjacent ad hoc cluster, and selecting the primary route or secondary route.

40. The at least one processor of claim 39, wherein the second module is further configured to select the primary route during the first type of inter-cluster call, and to select either the primary or secondary route during the second type of call, the selection of the primary or secondary route being based on the loading of the ad hoc network backbone.

41. The at least one processor of claim 39, wherein the second module is further configured to establish the route by mapping the primary route to a first adjacent gateway terminal and a first adjacent master terminal for the first adjacent gateway terminal, and mapping the secondary route to a second adjacent gateway terminal and a second adjacent master terminal for the second adjacent gateway terminal.

42. The at least one processor of claim 41, wherein the second module is further configured to establish the route by communicating with the respective first or second adjacent master terminal mapped to the first or second adjacent ad hoc cluster corresponding to the selected one of the primary or secondary routes to support intra-cluster scheduling and forwarding of such communication packet from the second terminal.

43. The server terminal of claim 1, wherein the route on the ad hoc network backbone is configured to pass through a first picocell for the first type of call and configured not to pass through the first picocell for the second type of call.

44. The method of claim 12, wherein the route on the ad hoc network backbone is configured to pass through a first picocell for the first type of call and configured not to pass through the first picocell for the second type of call.

45. The server terminal of claim 25, wherein the route on the ad hoc network backbone is configured to pass through a first picocell for the first type of call and configured not to pass through the first picocell for the second type of call.

46. The method of claim 26, wherein the route on the ad hoc network backbone is configured to pass through a first picocell for the first type of call and configured not to pass through the first picocell for the second type of call.

47. The processor of claim 31, wherein the route on the ad hoc network backbone is configured to pass through a first picocell for the first type of call and configured not to pass through the first picocell for the second type of call.

48. The computer program product of claim 32, wherein the route on the ad hoc network backbone is configured to pass through a first picocell for the first type of call and configured not to pass through the first picocell for the second type of call.

49. The processor of claim 33, wherein the route on the ad hoc network backbone is configured to pass through a first picocell for the first type of call and configured not to pass through the first picocell for the second type of call.

50. The computer program product of claim 34, wherein the route on the ad hoc network backbone is configured to pass through a first picocell for the first type of call and configured not to pass through the first picocell for the second type of call.

51. The apparatus of claim 35, wherein the route on the ad hoc network backbone is configured to pass through a first picocell for the first type of call and configured not to pass through the first picocell for the second type of call.

52. The terminal system of claim 36, wherein the route on the ad hoc network backbone is configured to pass through a first picocell for the first type of call and configured not to pass through the first picocell for the second type of call.

53. The server terminal of claim 1, wherein the respective gateway terminal of one of the plurality of clusters is configured to form a direct communications link with another gateway terminal of a different one of the plurality of clusters, and wherein the respective intra-cluster bridge terminal of one of the two piconets is configured to form a direct communications link with another intra-cluster bridge terminal of a different one of the two piconets.

54. The method of claim 12, wherein the respective gateway terminal of one of the plurality of clusters is configured to form a direct communications link with another gateway terminal of a different one of the plurality of clusters, and wherein the respective intra-cluster bridge terminal of one of the two piconets is configured to form a direct communications link with another intra-cluster bridge terminal of a different one of the two piconets.

55. The server terminal of claim 25, wherein the respective gateway terminal of one of the plurality of clusters is configured to form a direct communications link with another gateway terminal of a different one of the plurality of clusters, and wherein the respective intra-cluster bridge terminal of one of the two piconets is configured to form a direct communications link with another intra-cluster bridge terminal of a different one of the two piconets.

56. The method of claim 26, wherein the respective gateway terminal of one of the plurality of clusters is configured to form a direct communications link with another gateway terminal of a different one of the plurality of clusters, and wherein the respective intra-cluster bridge terminal of one of the two piconets is configured to form a direct communications link with another intra-cluster bridge terminal of a different one of the two piconets.

57. The at least one processor of claim 31, wherein the respective gateway terminal of one of the plurality of clusters is configured to form a direct communications link with another gateway terminal of a different one of the plurality of clusters, and wherein respective the intra-cluster bridge terminal of one of the two piconets is configured to form a direct communications link with another intra-cluster bridge terminal of a different one of the two piconets.

58. The computer program product of claim 32, wherein the respective gateway terminal of one of the plurality of clusters is configured to form a direct communications link with another gateway terminal of a different one of the plurality of clusters, and wherein the respective intra-cluster bridge terminal of one of the two piconets is configured to form a direct communications link with another intra-cluster bridge terminal of a different one of the two piconets.

59. The processor of claim 33, wherein the respective gateway terminal of one of the plurality of clusters is configured to form a direct communications link with another gateway terminal of a different one of the plurality of clusters, and wherein the respective intra-cluster bridge terminal of one of the two piconets is configured to form a direct communications link with another intra-cluster bridge terminal of a different one of the two piconets.

60. The computer program product of claim 34, wherein the gateway terminal of one of the plurality of clusters is configured to form a direct communications link with another gateway terminal of a different one of the plurality of clusters, and wherein the intra-cluster bridge terminal of one of the two piconets is configured to form a direct communications link with another intra-cluster bridge terminal of a different one of the two piconets.

61. The apparatus of claim 35, wherein the respective gateway terminal of one of the plurality of clusters is configured to form a direct communications link with another gateway terminal of a different one of the plurality of clusters, and wherein the respective intra-cluster bridge terminal of one of the two piconets is configured to form a direct communications link with another intra-cluster bridge terminal of a different one of the two piconets.

62. The terminal system of claim 36, wherein the respective gateway terminal of one of the plurality of clusters is configured to form a direct communications link with another gateway terminal of a different one of the plurality of clusters, and wherein the respective intra-cluster bridge terminal of one of the two piconets is configured to form a direct communications link with another intra-cluster bridge terminal of a different one of the two piconets.

\* \* \* \* \*